(12) United States Patent
Wang et al.

(10) Patent No.: US 11,943,043 B2
(45) Date of Patent: Mar. 26, 2024

(54) UPLINK FREQUENCY TARGET FOR NON-TERRESTRIAL NETWORK

(71) Applicant: QUALCOMM Incorporated, San Diego, CA (US)

(72) Inventors: Xiao Feng Wang, San Diego, CA (US); Peter Gaal, San Diego, CA (US); Alberto Rico Alvarino, San Diego, CA (US); Jun Ma, San Diego, CA (US); Qiang Wu, San Diego, CA (US); Liangping Ma, San Diego, CA (US); Ayan Sengupta, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 17/302,516

(22) Filed: May 5, 2021

(65) Prior Publication Data

US 2021/0359752 A1 Nov. 18, 2021

Related U.S. Application Data

(60) Provisional application No. 63/025,538, filed on May 15, 2020.

(51) Int. Cl.
*H04B 7/185* (2006.01)
*H04W 72/0453* (2023.01)
(Continued)

(52) U.S. Cl.
CPC .... *H04B 7/18532* (2013.01); *H04W 72/0453* (2013.01); *G01S 19/29* (2013.01); *H04W 88/16* (2013.01)

(58) Field of Classification Search
CPC .............. H04B 7/18532; H04B 7/1855; H04B 7/18513; H04W 72/0453; H04W 88/16;
(Continued)

(56) References Cited

U.S. PATENT DOCUMENTS

2014/0036808 A1\* 2/2014 Pelletier .............. H04W 52/146
370/329
2022/0038139 A1\* 2/2022 Eriksson Löwenmark ..................
H04W 72/23

FOREIGN PATENT DOCUMENTS

CN 110418402 A 11/2019
WO WO-2020089471 A1 5/2020

OTHER PUBLICATIONS

International Search Report and Written Opinion—PCT/US2021/031068—ISA/EPO—dated Sep. 17, 2021.
(Continued)

*Primary Examiner* — Shaima Q Aminzay
(74) *Attorney, Agent, or Firm* — Harrity & Harrity, LLP (57) ABSTRACT

Various aspects of the present disclosure generally relate to wireless communication. In some aspects, a user equipment may determine a transmission frequency for an uplink transmission based at least in part on a reference point for the uplink transmission, the reference point being associated with one of: a satellite that provides a cell covering the user equipment, the satellite being associated with a non-terrestrial network, or a gateway associated with the satellite; and transmit the uplink transmission based at least in part on the transmission frequency. Numerous other aspects are provided.

30 Claims, 6 Drawing Sheets

(51) Int. Cl.
*G01S 19/29* (2010.01)
*H04W 88/16* (2009.01)
(58) Field of Classification Search
CPC ..... H04W 88/06; H04W 24/02; H04W 48/12; G01S 19/29
USPC ....................................................... 455/12.1
See application file for complete search history.

(56) References Cited

OTHER PUBLICATIONS

Nokia, et al., "Doppler Compensation, Uplink Timing Advance and Random Access in NTN", 3GPP Draft, 3GPP TSG RAN WG1 #99, R1-1913017, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 9, 2019 (Nov. 9, 2019), XP051823750, 29 Pages, Retrieved from the Internet: URL: https://ftp.3gpp.org/tsg_ran/WG1_RL1/TSGR1_99/Docs/R1-1913017.zip R1-1913017. docx [retrieved on Nov. 9, 2019], sections 1-6, figures 1-3, 5-9, the whole document.

* cited by examiner

UPLINK FREQUENCY TARGET FOR NON-TERRESTRIAL NETWORK

CROSS-REFERENCE TO RELATED APPLICATION

This Patent Application claims priority to U.S. Provisional Patent Application No. 63/025,538, filed on May 15, 2020, entitled "UPLINK FREQUENCY TARGET FOR NON-TERRESTRIAL NETWORK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for an uplink frequency target for a non-terrestrial network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment for wireless communication may include a memory and one or more processors coupled to the memory. The memory and the one or more processors may be configured to determine a transmission frequency for an uplink transmission based at least in part on a reference point for the uplink transmission, the reference point being associated with one of: a satellite that provides a cell covering the user equipment, the satellite being associated with a non-terrestrial network, or a gateway associated with the satellite; and transmit the uplink transmission based at least in part on the transmission frequency.

In some aspects, a method of wireless communication, performed by a user equipment, may include determining a transmission frequency for an uplink transmission based at least in part on a reference point for the uplink transmission, the reference point being associated with one of: a satellite that provides a cell covering the user equipment, the satellite being associated with a non-terrestrial network, or a gateway associated with the satellite; and transmitting the uplink transmission based at least in part on the transmission frequency.

In some aspects, a non-transitory computer-readable medium may store one or more instructions for wireless communication. The one or more instructions, when executed by one or more processors of a user equipment, may cause the one or more processors to determine a transmission frequency for an uplink transmission based at least in part on a reference point for the uplink transmission, the reference point being associated with one of: a satellite that provides a cell covering the user equipment, the satellite being associated with a non-terrestrial network, or a gateway associated with the satellite; and transmit the uplink transmission based at least in part on the transmission frequency.

In some aspects, an apparatus for wireless communication may include means for determining a transmission frequency for an uplink transmission based at least in part on a reference point for the uplink transmission, the reference point being associated with one of: a satellite that provides a cell covering the apparatus, the satellite being associated with a non-terrestrial network, or a gateway associated with the satellite; and means for transmitting the uplink transmission based at least in part on the transmission frequency.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
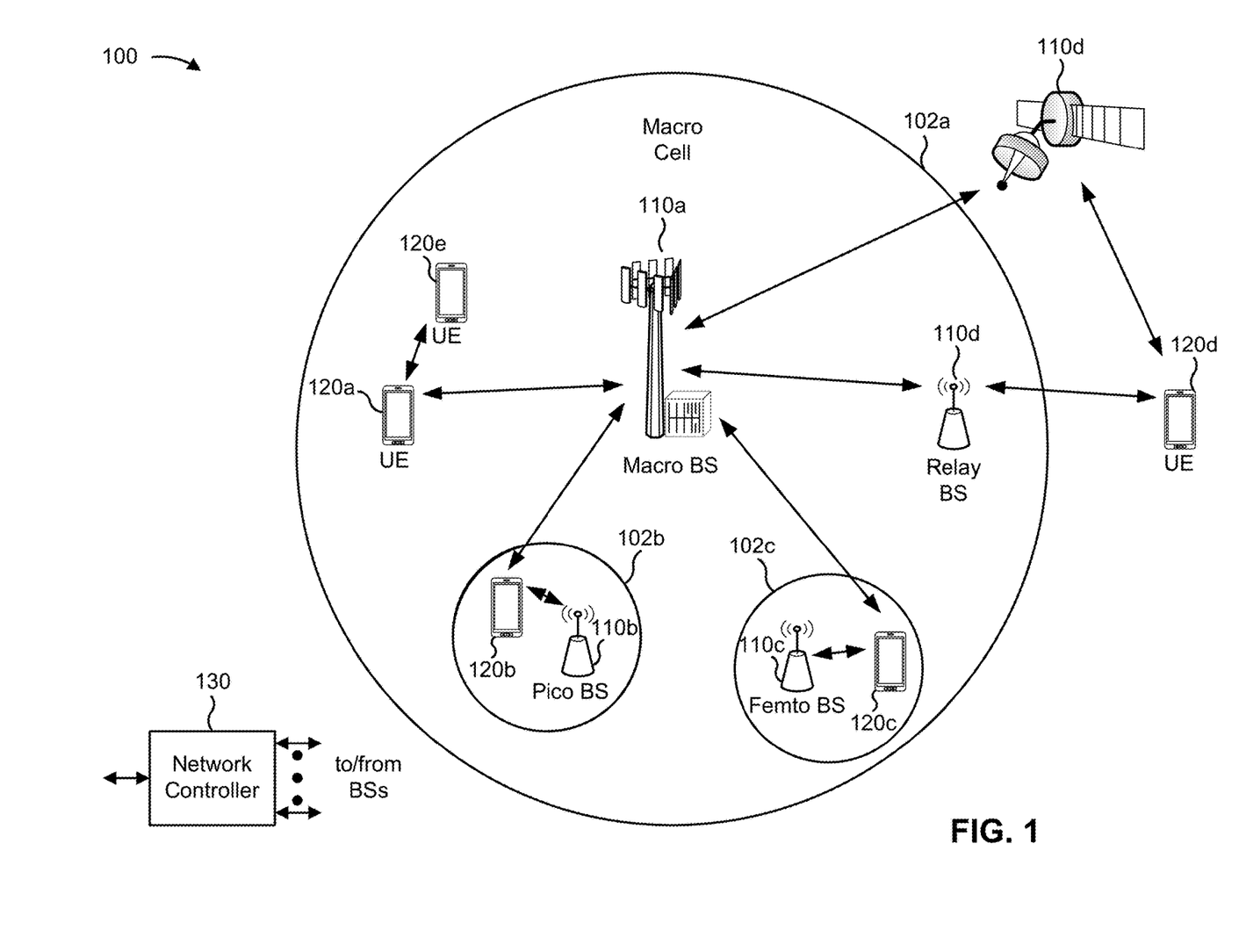
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and relay station 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used. In some aspects, a BS may be implemented on a satellite. In such a case, the geographic area of the cell provided by the BS may move with the BS.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like. In some aspects, as shown, a satellite may act as a relay station 110d and may be referred to as a transparent satellite. In such an implementation, BS 110a may be referred to as or part of a gateway or an earth station. For example, the BS 110a may include a gateway (that is, the base station and gateway may be co-located or implemented in one device).

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
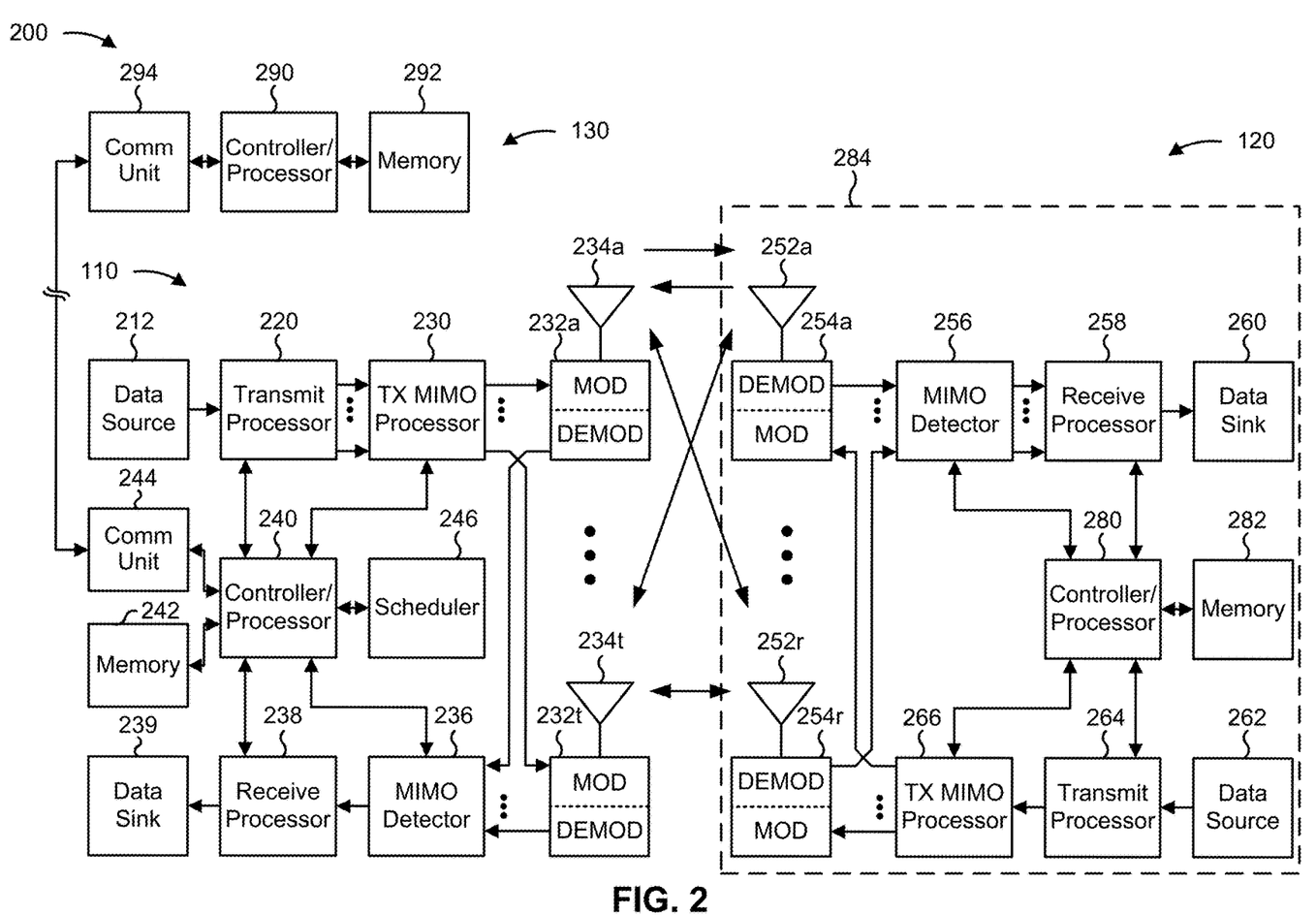
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with an uplink frequency target for a non-terrestrial network, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, UE 120 may include means for determining a transmission frequency for an uplink transmission based at least in part on a reference point for the uplink transmission, means for transmitting the uplink transmission based at least in part on the transmission frequency, means for receiving information indicating a location of the gateway or a Doppler drift value associated with a feeder link between the gateway and the satellite based at least in part on the gateway being the reference point, means for receiving information indicating whether the reference point is the satellite or the gateway, means for receiving information indicating whether a target uplink frequency used to determine the transmission frequency is controlled by a received downlink frequency of the user equipment or is independent of the received downlink frequency of the user equipment, means for determining whether a target uplink frequency used to determine the transmission frequency is controlled by a received downlink frequency of the user equipment or is independent of the received downlink frequency of the user equipment based at least in part on a capability of the user equipment, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
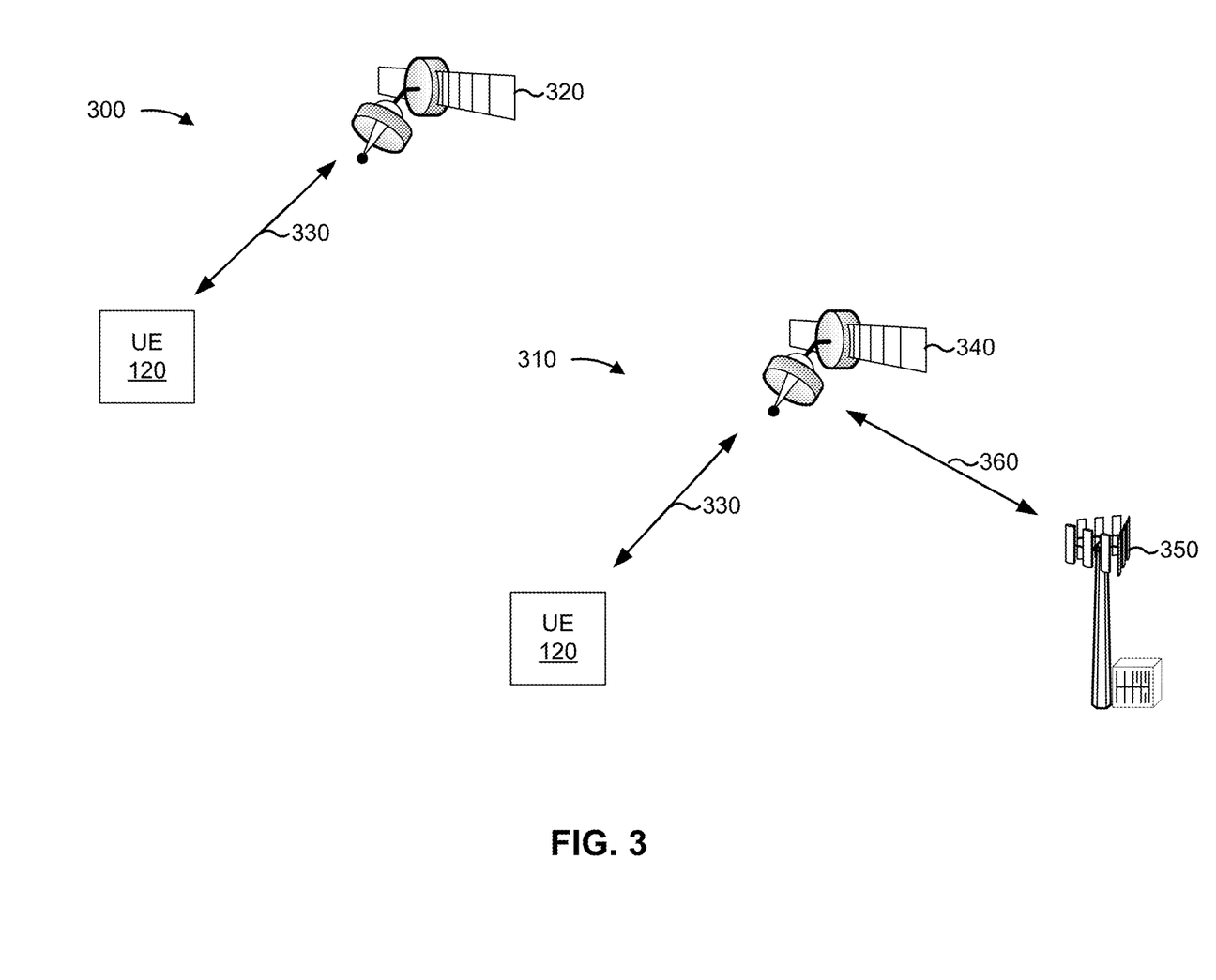
FIG. 3 is a diagram illustrating an example of a regenerative satellite deployment and of a transparent satellite deployment in a non-terrestrial network.

FIG. 3 is a diagram illustrating an example 300 of a regenerative satellite deployment and an example 310 of a transparent satellite deployment in a non-terrestrial network.

Example 300 shows a regenerative satellite deployment. In example 300, a UE 120 is served by a satellite 320 via a service link 330. For example, the satellite 320 may include a BS 110 (e.g., BS 110a, relay station 110d) and/or the like.

More specifically, the satellite 320 may include a gNB or a distributed unit of a gNB. In some aspects, the satellite 320 may be referred to as a non-terrestrial base station, a regenerative repeater, an on-board processing repeater, and/or the like. In some aspects, the satellite 320 may demodulate an uplink radio frequency signal, and may modulate a baseband signal derived from the uplink radio signal to produce a downlink radio frequency transmission. For example, the satellite 320 may perform digital processing of a received signal to generate the downlink radio frequency transmission. The satellite 320 may transmit the downlink radio frequency signal on the service link 330. The satellite 320 may provide a cell that covers the UE 120. For example, the UE 120 may connect to the cell provided by the satellite 320. The service link 330 is a radio link between the satellite 320 and the UE 120.

Example 310 shows a transparent satellite deployment, which may also be referred to as a bent-pipe satellite deployment. In example 310, a UE 120 is served by a satellite 340 via the service link 330. The satellite 340 may be a transparent satellite. The satellite 340 may relay a signal received from gateway 350 via a feeder link 360. Gateway 350 may include a BS 110 (such as a gNB), an earth station, a router interfacing to a control network, or the like. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 330 to a frequency of the uplink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability, a Global Positioning System (GPS) capability, and/or the like, though not all UEs have such capabilities. The satellite 340 may provide a cell that covers the UE 120. For example, the UE 120 may connect to the cell provided by the satellite 340.

The service link 330 may include a link between the satellite 340 and the UE 120, and may include one or more of an uplink or a downlink. The feeder link 360 may include a link between the satellite 340 and the gateway 350, and may include one or more of an uplink (e.g., from the UE to the gateway) or a downlink (e.g., from the gateway to the UE). An uplink of the service link 330 may be shown by reference number 330-U in subsequent Figures and a downlink of the service link 330 may be shown by reference number 330-D in subsequent Figures. Similarly, an uplink of the feeder link 360 may be shown by reference number 360-U in subsequent Figures and a downlink of the feeder link 360 may be shown by reference number 360-D in subsequent Figures.

The feeder link 360 and the service link 330 may each experience Doppler effects due to the movement of the satellites 320 and 340, and potentially movement of a UE 120. These Doppler effects may be significantly larger than in a terrestrial network due to the larger relative speed of the satellites 320 and 340 relative to the UE in an NTN. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error (that is, frequency errors associated with components of the gateway 350 and/or the satellite 320/340, as compared to frequency errors caused by Doppler effects). These sources of frequency error may cause a received downlink frequency at the UE 120 to drift from a target downlink frequency.

As indicated above, FIG. 3 is provided as an example. Other examples may differ from what is described with regard to FIG. 3.

A UE may perform an uplink transmission in accordance with a transmission frequency for the uplink transmission. The transmission frequency is the actual frequency measured at the UE's output. In terrestrial mobile communications, an uplink transmission frequency may be synchronized with a received downlink frequency. For example, the received downlink frequency may not exactly match an assigned downlink frequency based at least in part on, for example, network-side oscillator errors. The UE may synchronize with a base station in accordance with an observed downlink frequency. Once the UE has synchronized to the received downlink signal, the uplink signal may use the received downlink signal as a reference frequency. As one example, in a time division duplexing (TDD) configuration, the target uplink frequency may be the same frequency as the received downlink signal. As another example, in a frequency division duplexing (FDD) configuration, the target uplink frequency may be equal to the received downlink frequency multiplied by a ratio of an assigned uplink frequency and the received downlink frequency. Thus, the UE may align the UE's uplink frequency with an observed downlink frequency in order to facilitate communication with the base station in view of error in the received downlink frequency.

In a non-terrestrial network, there are multiple sources of frequency error. For example, a gateway may have a residual frequency error due to, for example, one or more components of the gateway. The gateway may transmit a signal to the satellite (which may be subject to the residual frequency error). The satellite may perform a frequency translation and forward the signal to the UE. The satellite may also be associated with some degree of uncompensated Doppler drift relative to the gateway due to a location and/or speed of the satellite relative to the gateway. Furthermore, the satellite may be associated with an onboard frequency error (due to one or more components of the satellite), and a service link between the satellite and the UE may be associated with a Doppler drift separate from a feeder link between the satellite and the gateway due to a location and/or speed of the satellite relative to the UE.

Different points of reference for determination of a transmission frequency used to perform an uplink transmission may lead to different determinations of the transmission frequency, since there are multiple sources of frequency errors in non-terrestrial networks (NTNs), and Doppler drifts can be large and/or unknown. For example, if the transmission frequency is determined with reference to a target uplink frequency measured at a satellite, then the transmission frequency to be transmitted by the UE may be different than if the target uplink frequency is measured with reference to a gateway associated with a transparent satellite (due to different Doppler drifts and/or different frequency errors associated with the satellite and/or the gateway). Furthermore, some UEs may have a GNSS capability or a similar capability from which a frequency can be determined, while other UEs may not have a GNSS capability or a similar capability. A UE that has a GNSS capability may be capable of deriving a more accurate frequency estimate from the GNSS capability than from some methods used in terrestrial networks, such as referring to a received downlink frequency. However, a UE that does not have a GNSS capability may not be capable of deriving a frequency estimate from the GNSS capability.

Techniques and apparatuses described herein define a target uplink frequency based at least in part on a reference point where the target uplink frequency is to be measured (either the satellite or the gateway). The reference point is a point at which, if frequency adjustment is performed properly, a signal is received at a target uplink frequency. By specifying the reference point, different UEs can determine appropriate frequency compensation in a uniform fashion, thereby improving frequency accuracy of uplink transmissions and reducing interference. The target uplink frequency may be independent from the received downlink frequency, or may be controlled by the received downlink frequency. If the target uplink frequency is controlled by the received downlink frequency, then the UE may perform Doppler compensation based at least in part on the received downlink frequency, which may be beneficial for low-capability UEs and/or the like. If the target uplink frequency is independent from the received downlink frequency, then the UE may determine the target uplink frequency based at least in part on a positioning system (e.g., GPS, GNSS, and/or the like), which may provide improved accuracy relative to downlink signal based determination of the target uplink frequency. When the uncompensated feeder link doppler and gateway and satellite on-board frequency errors are small, uplink transmissions with frequency based at least in part on received downlink frequency and with frequency independent of the received downlink frequency can coexist without significant interference.

Figure 4:
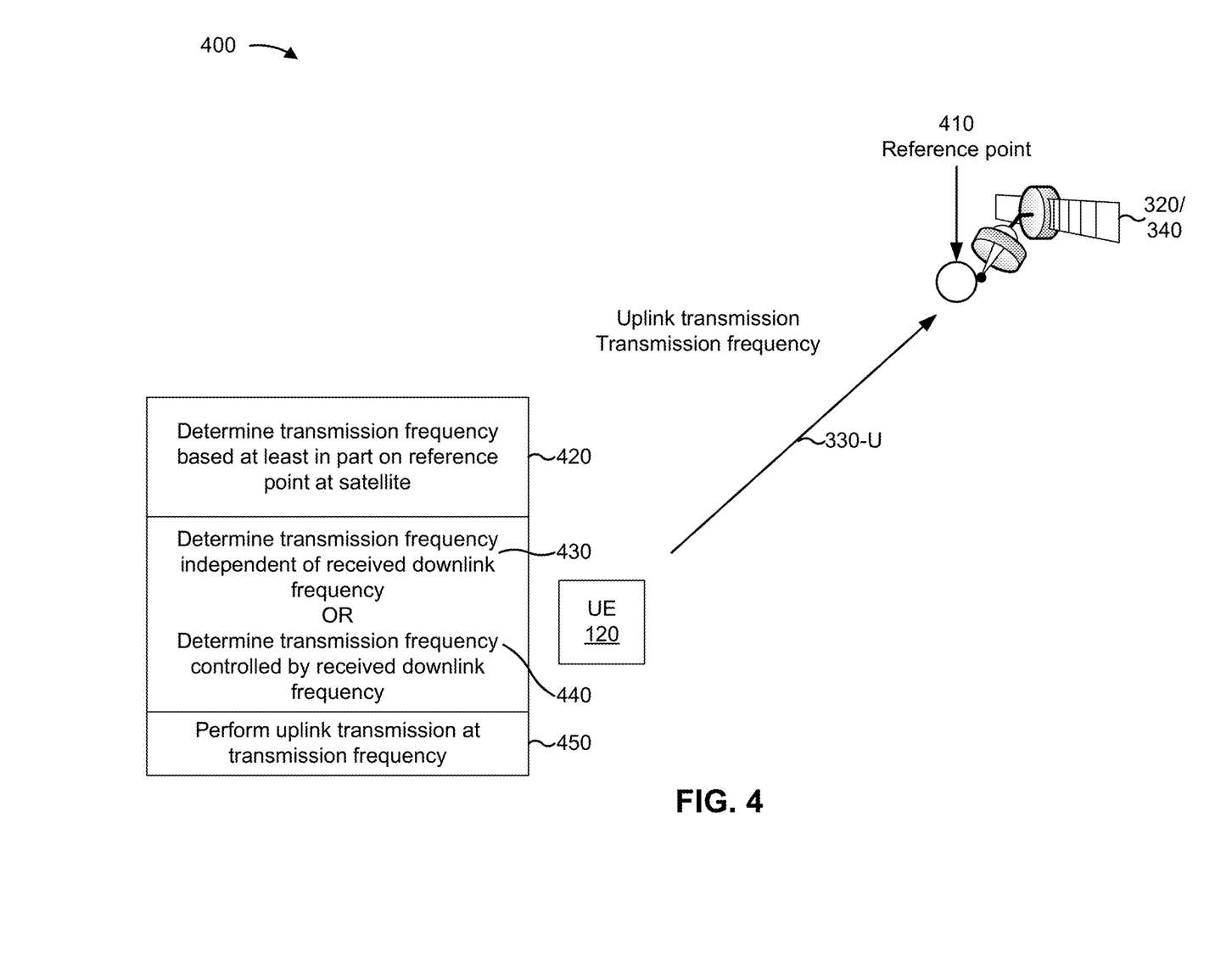
FIG. 4 is a diagram illustrating an example of frequency adjustment based at least in part on a reference point at a satellite, in accordance with the present disclosure.

FIG. 4 is a diagram illustrating an example 400 of frequency adjustment based at least in part on a reference point at a satellite, in accordance with the present disclosure. As shown, example 400 includes a UE 120 and a satellite 320/340. As described elsewhere herein, the satellite 320/340 may be a regenerative satellite or a transparent satellite. The gateway (e.g., gateway 350) associated with the satellite 340 is omitted in FIG. 4.

As shown by reference number 410, the reference point for a target uplink frequency may be the satellite 320/340. Therefore, as shown by reference number 420, the UE 120 may determine a transmission frequency based at least in part on a reference point at the satellite. For example, the UE 120 may adjust a frequency based at least in part on an expected frequency drifts on both the downlink and uplink of the service link 330 so that the satellite 320/340 receives a signal at the target uplink frequency or within an acceptable range of the target uplink frequency.

In some aspects, as shown by reference number 430, the UE 120 may determine the transmission frequency independent of a received downlink frequency. For example, the UE 120 may determine the target uplink frequency as an assigned uplink frequency for the uplink transmission. In such a case, the UE 120 may determine the transmission frequency based at least in part on a GNSS capability, a GPS capability, and/or the like. For example, the UE 120 may determine a frequency source to control a clock function of the UE 120 using the GNSS capability or the GPS capability, and may determine the transmission frequency using the clock function as a clock source for the uplink transmission. As another example, the UE 120 may use position information, speed information, velocity information, and/or the like to estimate a Doppler drift associated with the service link 330, and may adjust the transmission frequency to compensate for the Doppler drift at the reference point. The position information, speed information, or velocity information can be for the UE 120 (such as determined using the GNSS capability or the GPS capability) and/or for the satellite 320/340. For example, the satellite 320/340 may transmit, to the UE 120, position information and speed information (such as in a system information block). In some aspects, the transmitted information may identify an ephemeris (e.g., a position and/or velocity over time) of the satellite 320/340.

In some aspects, the UE 120 may determine the uplink transmission using the frequency source of the GPS/GNSS capability and may adjust the uplink transmission based at least in part on the position information, speed information, velocity information, and/or the like. Determining the transmission frequency independent of the received downlink frequency may be beneficial for UEs that have GPS/GNSS capabilities, since determining the transmission frequency using the GPS/GNSS capability may be more accurate and/or reliable than determining the transmission frequency as controlled by the received downlink frequency.

As an example of determining the transmission frequency independent of the received downlink frequency when the satellite 320/340 is the reference point, the transmission frequency (e.g., an ideal transmit frequency) may be equal to ft=ful_assigned−Doppler_service such that the carrier frequency measured by the satellite 320/340 is f=ful_assigned, where ft is the transmission frequency, ful_assigned is an assigned uplink frequency for the uplink transmission, and Doppler_service is a Doppler drift on the service link 330.

As shown by reference number 440, in some aspects, the UE 120 may determine the transmission frequency as controlled by a received downlink frequency. For example, the UE 120 may use a received downlink signal as a frequency source to control a clock function of the UE 120, and the clock function may be used as a clock source for the uplink transmission. Thus, the UE 120 may adjust the transmission frequency based at least in part on Doppler drift on the service link 330 and/or an on-board frequency error at the satellite 320/340. Determining the transmission frequency as controlled by a received downlink frequency may be less resource intensive than determining the transmission frequency using a GPS/GNSS capability, and may be useful for UEs that do not have GPS/GNSS capabilities.

As an example, if the transmission frequency is coupled with the received downlink frequency, a UE 120's transmission frequency (e.g., an ideal transmit frequency, ft) should ensure that the uplink carrier frequency measured by the satellite 320/340 (e.g., the target uplink frequency) is equal to f=fdl*ful_assigned/fdl_assigned, where fdl_assigned is an assigned downlink frequency of the communication and fdl=fdl_transmit_satellite−fdl_compensated is a determined downlink frequency with fdl_compensated being a pre-compensated downlink frequency (e.g., a frequency adjustment applied by the satellite 320/340 to compensate for Doppler drift on the service link 330), and fdl_transmit_satellite being an actual transmitted downlink frequency after pre-compensation is applied. If downlink pre-compensation is applied, the pre-compensated value (e.g., fdl_compensated) may be signaled in a system information block (SIB), for example, per beam or per satellite 320/340. Thus, the UE 120 may use fdl_compensated to account for a Doppler drift value on the service link 330 in order to determine the transmitted downlink frequency fdl_transmit_satellite relative to fdl.

In some aspects, the UE 120 may be capable of determining the transmission frequency independently of the received downlink frequency and as controlled by the received downlink frequency. In such a case, the UE 120 may receive signaling indicating whether to determine the transmission frequency independently of the received downlink frequency or as controlled by the received downlink frequency. In some aspects, a wireless communication specification may specify whether the UE 120 is to determine the transmission frequency independently of the received downlink frequency or as controlled by the received downlink frequency. In some aspects, the UE 120 may select whether to determine the transmission frequency independently of the received downlink frequency or as controlled by the received downlink frequency, for example, based at least in part on a capability of the UE 120 (e.g., whether the UE 120 is associated with a GNSS/GPS capability), a state of the UE 120 (e.g., whether the UE 120 is associated with an active GNSS/GPS unit), an interference condition, and/or the like.

As shown by reference number 450, the UE 120 may transmit the uplink transmission using the transmission frequency. By determining the transmission frequency using the satellite 320/340 as the reference point, the determination of the transmission frequency may be simplified, since the UE 120 does not need to handle feeder link Doppler drift (e.g., since feeder link Doppler drift is common to all UEs covered by a satellite 320/340 and thus does not cause inter-carrier interference). Furthermore, a gateway can typically compensate feeder link Doppler effects more effectively than a UE 120, since the gateway may have more accurate location information regarding the satellite 320/240 than the UE 120.

Figure 5:
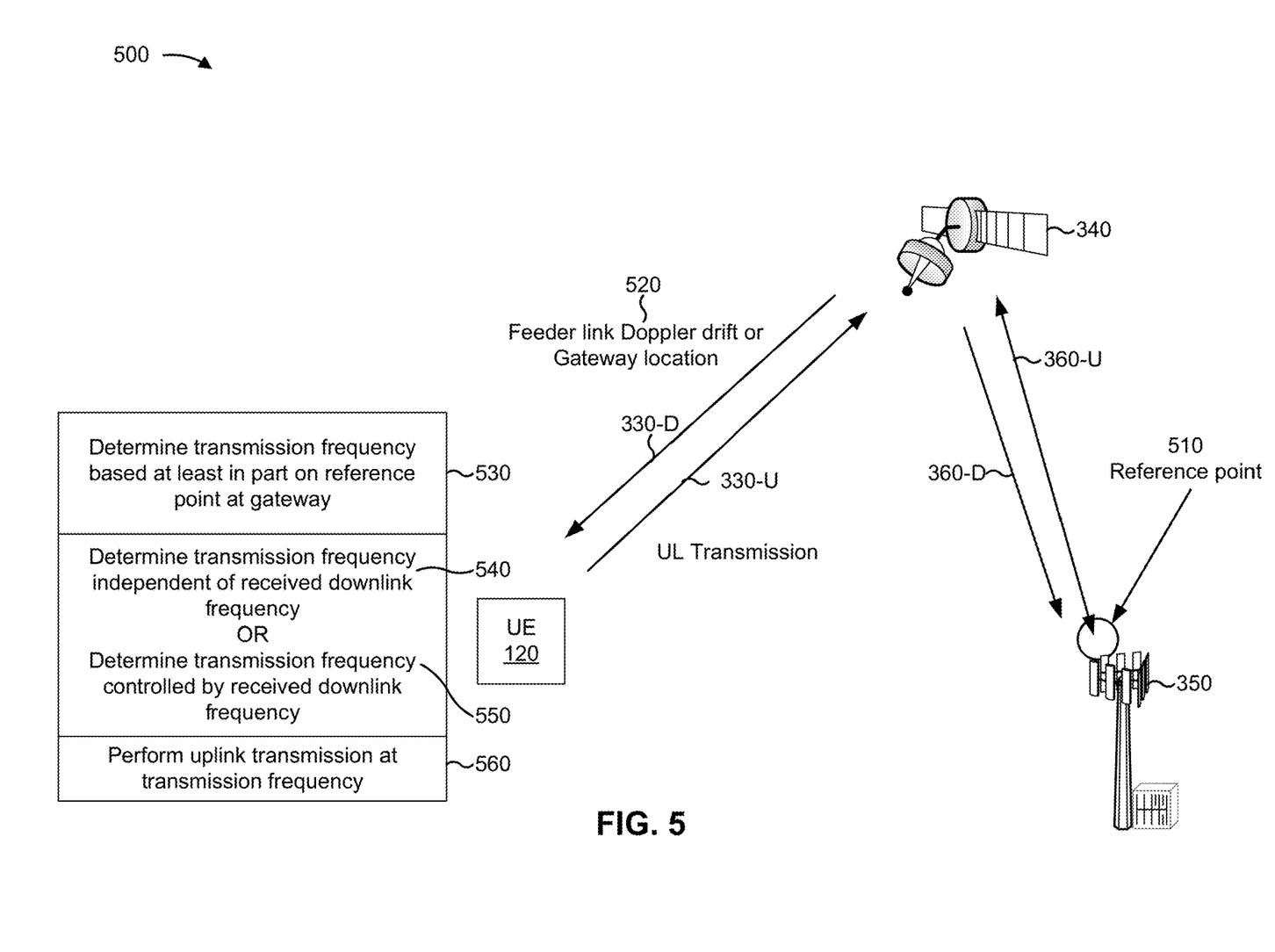
FIG. 5 is a diagram illustrating an example of frequency adjustment based at least in part on a reference point at a gateway, in accordance with the present disclosure.

FIG. 5 is a diagram illustrating an example 500 of frequency adjustment based at least in part on a reference point 510 at a gateway 350, in accordance with the present disclosure. As shown in FIG. 5, example 500 includes a satellite 340 and a gateway 350, as well as a UE 120.

As shown by reference number 520, the satellite 340 may signal, to the UE 120, information indicating one or more of a feeder link Doppler drift (e.g., a Doppler drift associated with the feeder link 360, which may be expressed as a Doppler value and a rate of change associated with the Doppler value) or location information associated with the gateway 350 (such as a position of the gateway 350 and/or a speed of the gateway 350). For example, when the reference point 510 is at the gateway 350, the UE 120 may compensate Doppler drift associated with the feeder link 360 as well as Doppler drift associated with the service link 330. As shown by reference number 530, the UE 120 may determine a transmission frequency based at least in part on the reference point at the gateway 350. For example, the UE 120 may determine the transmission frequency so that an uplink transmission by the UE 120 is received at the gateway 350 at a target uplink frequency, taking into account Doppler drifts on the service link 330 and the feeder link 360, as well as residual frequency error at the gateway 350 and on-board frequency error at the satellite 340. The UE 120 may determine the Doppler drift on the feeder link 360 based at least in part on the signaling shown by reference number 520. For example, the UE 120 may use the feeder link Doppler drift value, or may determine a feeder link Doppler drift value based at least in part on a relative position and/or velocity of the gateway 350 relative to the UE 120 and/or the satellite 340. The information shown by reference number 520 may be signaled, for example, using a SIB and/or the like.

As shown by reference number 540, in some aspects, the UE 120 may determine the transmission frequency independent of a received downlink frequency. Determining the transmission frequency independent of a received downlink frequency is described in more detail in connection with FIG. 4. As shown by reference number 550, in other aspects, the UE 120 may determine the transmission frequency as controlled by the received downlink frequency, which is also described in more detail in connection with FIG. 4. As shown by reference number 560, the UE 120 may transmit the uplink transmission at the transmission frequency. Thus, the gateway 350 may receive the uplink transmission at approximately the target uplink frequency, since the transmission frequency compensates for Doppler drifts on links 330 and 360, as well as on-board frequency error of the satellite 340 and residual frequency error of the gateway 350.

In some aspects, the UE 120 may receive signaling indicating whether the reference point is to be at the satellite 340 or the gateway 350 in a transparent deployment, which may provide increased flexibility for configuration of the reference point. For example, the signaling may include a SIB and/or the like. In some aspects, the reference point may be specified, for example, by a wireless communication specification, which may conserve signaling resources.

As indicated above, FIG. 5 is provided as an example. Other examples may differ from what is described with regard to FIG. 5.

Figure 6:
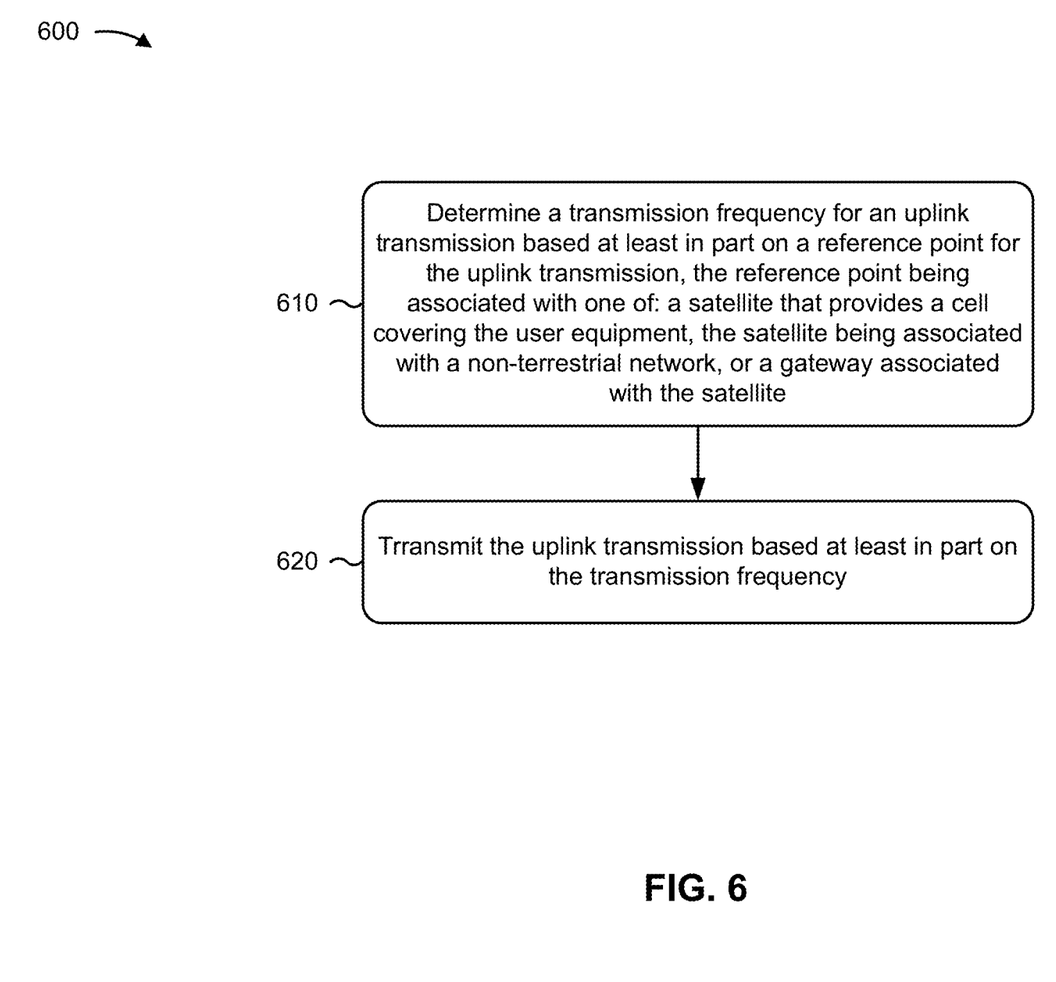
FIG. 6 is a diagram illustrating an example process associated with uplink transmission frequency determination in a non-terrestrial network, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with an uplink frequency target for a non-terrestrial network.

As shown in FIG. 6, in some aspects, process 600 may include determining a transmission frequency for an uplink transmission based at least in part on a reference point for the uplink transmission, the reference point being associated with one of: a satellite that provides a cell covering the user equipment, the satellite being associated with a non-terrestrial network, or a gateway associated with the satellite (block 610). For example, the UE (e.g., using antenna 252, DEMOD 254, MIMO detector 256, receive processor 258, controller/processor 280, and/or the like) may determine a transmission frequency for an uplink transmission based at least in part on a reference point for the uplink transmission. The reference point may be associated with one of a satellite that provides a cell covering the user equipment, the satellite being associated with a non-terrestrial network, or a gateway associated with the satellite, as described above.

As further shown in FIG. 6, in some aspects, process 600 may include transmitting the uplink transmission based at least in part on the transmission frequency (block 620). For example, the UE (e.g., using controller/processor 280, transmit processor 264, TX MIMO processor 266, MOD 254, antenna 252, and/or the like) may transmit the uplink transmission based at least in part on the transmission frequency, as described above.

Process 600 may include additional aspects, such as any single aspect or any combination of aspects described below and/or in connection with one or more other processes described elsewhere herein.

With respect to process 600, in a first aspect, process 600 includes receiving information indicating a location of the gateway or a Doppler drift value associated with a feeder link between the gateway and the satellite based at least in part on the gateway being the reference point.

With respect to process 600, in a second aspect, alone or in combination with the first aspect, the information is received in a system information block.

With respect to process 600, in a third aspect, alone or in combination with one or more of the first and second aspects, process 600 includes receiving information indicating whether the reference point is the satellite or the gateway.

With respect to process 600, in a fourth aspect, alone or in combination with one or more of the first through third aspects, the information is received in a system information block.

With respect to process 600, in a fifth aspect, alone or in combination with one or more of the first through fourth aspects, the reference point is defined in a wireless communication specification.

With respect to process 600, in a sixth aspect, alone or in combination with one or more of the first through fifth aspects, the transmission frequency is determined based at least in part on a target uplink frequency, and the target uplink frequency is an assigned uplink frequency for the uplink transmission measured at the reference point.

With respect to process 600, in a seventh aspect, alone or in combination with one or more of the first through sixth aspects, the transmission frequency is independent of a received downlink frequency of the user equipment.

With respect to process 600, in an eighth aspect, alone or in combination with one or more of the first through seventh aspects, the transmission frequency is controlled by a received downlink frequency of the user equipment.

With respect to process 600, in a ninth aspect, alone or in combination with one or more of the first through eighth aspects, process 600 includes receiving information indicating whether a target uplink frequency used to determine the transmission frequency is controlled by a received downlink frequency of the user equipment or is independent of the received downlink frequency of the user equipment.

With respect to process 600, in a tenth aspect, alone or in combination with one or more of the first through ninth aspects, the information is received in a system information block.

With respect to process 600, in an eleventh aspect, alone or in combination with one or more of the first through tenth aspects, process 600 includes determining whether a target uplink frequency used to determine the transmission frequency is controlled by a received downlink frequency of the user equipment or is independent of the received downlink frequency of the user equipment based at least in part on a capability of the user equipment.

With respect to process 600, in a twelfth aspect, alone or in combination with one or more of the first through eleventh aspects, the capability is a Global Navigation Satellite System (GNSS) capability.

With respect to process 600, in a thirteenth aspect, alone or in combination with one or more of the first through twelfth aspects, a wireless communication specification specifies whether a target uplink frequency used to determine the transmission frequency is controlled by a received downlink frequency of the user equipment or is independent of the received downlink frequency of the user equipment.

With respect to process 600, in a fourteenth aspect, alone or in combination with one or more of the first through thirteenth aspects, the satellite is the reference point, a target uplink frequency used to determine the transmission frequency is independent of a downlink frequency of the user equipment, and the transmission frequency is based at least in part on an assigned uplink frequency and a Doppler drift value associated with a link between the user equipment and the satellite.

With respect to process 600, in a fifteenth aspect, alone or in combination with one or more of the first through fourteenth aspects, the satellite is the reference point, a target uplink frequency used to determine the transmission frequency is independent of a downlink frequency of the user equipment, and the transmission frequency is equal to an assigned uplink frequency minus a Doppler drift value associated with a link between the user equipment and the satellite.

With respect to process 600, in a sixteenth aspect, alone or in combination with one or more of the first through fifteenth aspects, the satellite is the reference point, a target uplink frequency used to determine the transmission frequency is based at least in part on a received downlink frequency of the user equipment, and the transmission frequency is based at least in part on a pre-compensated downlink frequency.

With respect to process 600, in a seventeenth aspect, alone or in combination with one or more of the first through sixteenth aspects, the transmission frequency is based at least in part on an assigned uplink frequency and a ratio of a determined downlink frequency and an assigned downlink frequency, and the determined downlink frequency is determined based at least in part on the pre-compensated downlink frequency and a transmitted downlink frequency transmitted by the satellite.

With respect to process 600, in an eighteenth aspect, alone or in combination with one or more of the first through seventeenth aspects, the transmission frequency is equal to an assigned uplink frequency multiplied by a ratio of a determined downlink frequency and an assigned downlink frequency, and the determined downlink frequency is determined by subtracting the pre-compensated downlink frequency from a transmitted downlink frequency transmitted by the satellite.

With respect to process 600, in a nineteenth aspect, alone or in combination with one or more of the first through eighteenth aspects, the pre-compensated downlink frequency is signaled to the user equipment in a system information block.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment, comprising: determining a transmission frequency for an uplink transmission based at least in part on a reference point for the uplink transmission, the reference point being associated with one of: a satellite that provides a cell covering the user equipment, the satellite being associated with a non-terrestrial network, or a gateway associated with the satellite; and transmitting the uplink transmission based at least in part on the transmission frequency.

Aspect 2: The method of Aspect 1, comprising: receiving information indicating a location of the gateway or a Doppler drift value associated with a feeder link between the gateway and the satellite based at least in part on the gateway being the reference point.

Aspect 3: The method of Aspect 2, wherein the information is received in a system information block.

Aspect 4: The method of Aspect 1, comprising: receiving information indicating whether the reference point is the satellite or the gateway.

Aspect 5: The method of Aspect 4, wherein the information is received in a system information block.

Aspect 6: The method of any of Aspects 1-5, wherein the reference point is defined in a wireless communication specification.

Aspect 7: The method of any of Aspects 1-6, wherein the transmission frequency is determined based at least in part on a target uplink frequency, and wherein the target uplink frequency is an assigned uplink frequency for the uplink transmission measured at the reference point.

Aspect 7: The method of Aspect 6, wherein the transmission frequency is independent of a received downlink frequency of the user equipment.

Aspect 8: The method of any of Aspects 1-7, wherein the transmission frequency is controlled by a received downlink frequency of the user equipment.

Aspect 9: The method of any of Aspects 1-8, comprising: receiving information indicating whether a target uplink frequency used to determine the transmission frequency is controlled by a received downlink frequency of the user equipment or is independent of the received downlink frequency of the user equipment.

Aspect 10: The method of Aspect 9, wherein the information is received in a system information block.

Aspect 11: The method of any of Aspects 1-10, comprising: determining whether a target uplink frequency used to determine the transmission frequency is controlled by a received downlink frequency of the user equipment or is independent of the received downlink frequency of the user equipment based at least in part on whether the user equipment has a capability.

Aspect 12: The method of Aspect 11, wherein the capability is being able to use a Global Navigation Satellite System (GNSS) as a frequency source.

Aspect 13: The method of any of Aspects 1-12, wherein a wireless communication specification specifies whether a target uplink frequency used to determine the transmission frequency is controlled by a received downlink frequency of the user equipment or is independent of the received downlink frequency of the user equipment.

Aspect 14: The method of any of Aspects 1-13, wherein the satellite is the reference point, wherein a target uplink frequency used to determine the transmission frequency is independent of a downlink frequency of the user equipment, and wherein the transmission frequency is based at least in part on an assigned uplink frequency and a Doppler drift value associated with a link between the user equipment and the satellite.

Aspect 15: The method of Aspect 14, comprising: estimating the Doppler drift value based at least in part on location information or speed information.

Aspect 16: The method of any of Aspects 1-15, wherein the satellite is the reference point, wherein a target uplink frequency used to determine the transmission frequency is independent of a downlink frequency of the user equipment, and wherein the transmission frequency is equal to an assigned uplink frequency minus a Doppler drift value associated with a link between the user equipment and the satellite.

Aspect 17: The method of any of Aspects 1-16, wherein the satellite is the reference point, wherein a target uplink frequency used to determine the transmission frequency is based at least in part on a received downlink frequency of the user equipment, and wherein the transmission frequency is based at least in part on a pre-compensated downlink frequency.

Aspect 18: The method of Aspect 17, wherein the transmission frequency is based at least in part on an assigned uplink frequency and a ratio of a determined downlink frequency and an assigned downlink frequency, wherein the determined downlink frequency is determined based at least in part on the pre-compensated downlink frequency and a transmitted downlink frequency transmitted by the satellite.

Aspect 19: The method of Aspect 17, wherein the transmission frequency is equal to an assigned uplink frequency multiplied by a ratio of a determined downlink frequency and an assigned downlink frequency, wherein the determined downlink frequency is determined by subtracting the pre-compensated downlink frequency from a transmitted downlink frequency transmitted by the satellite.

Aspect 20: The method of Aspect 17, wherein the pre-compensated downlink frequency is signaled to the user equipment in a system information block.

Aspect 21: An apparatus for wireless communication at a device, comprising a processor; memory coupled with the processor; and instructions stored in the memory and executable by the processor to cause the apparatus to perform the method of one or more Aspects of Aspects 1-20.

Aspect 22: A device for wireless communication, comprising a memory and one or more processors coupled to the memory, the memory and the one or more processors configured to perform the method of one or more Aspects of Aspects 1-20.

Aspect 23: An apparatus for wireless communication, comprising at least one means for performing the method of one or more Aspects of Aspects 1-20.

Aspect 24: A non-transitory computer-readable medium storing code for wireless communication, the code comprising instructions executable by a processor to perform the method of one or more Aspects of Aspects 1-20.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment for wireless communication, comprising:
   memory; and
   one or more processors coupled to the memory, the memory and the one or more processors configured to:
      estimate a Doppler drift, associated with a service link between the user equipment and a reference point for an uplink transmission, using a position of the user equipment and an ephemeris associated with the reference point, wherein the reference point is one of:
         a satellite that provides a cell covering the user equipment, the satellite being associated with a non-terrestrial network, or
         a gateway associated with the satellite;
      determine a transmission frequency for the uplink transmission using the reference point and a target uplink frequency for signal reception at the reference point, wherein the determining includes adjusting the transmission frequency to compensate for the estimated Doppler drift, and wherein the transmission frequency is independent of a received downlink frequency of the user equipment; and transmit the uplink transmission using the transmission frequency.

2. The user equipment of claim 1, wherein the one or more processors are configured to:

receive information indicating a location of the gateway or a Doppler drift value associated with a feeder link between the gateway and the satellite based at least in part on the gateway being the reference point.

3. The user equipment of claim 2, wherein the information is received in a system information block.

4. The user equipment of claim 1, wherein the one or more processors are configured to:

receive information indicating whether the reference point is the satellite or the gateway.

5. The user equipment of claim 4, wherein the information is received in a system information block.

6. The user equipment of claim 1, wherein the reference point is defined in a wireless communication specification.

7. The user equipment of claim 1, wherein the target uplink frequency is an assigned uplink frequency for the uplink transmission measured at the reference point.

8. The user equipment of claim 1, wherein the one or more processors are configured to:

receive information indicating whether the target uplink frequency is controlled by the received downlink frequency or is independent of the received downlink frequency.

9. The user equipment of claim 8, wherein the information is received in a system information block.

10. The user equipment of claim 1, wherein the one or more processors are configured to:

determine whether the target uplink frequency is controlled by the received downlink frequency or is independent of the received downlink frequency based at least in part on whether the user equipment has a capability.

11. The user equipment of claim 10, wherein the capability is being able to use a Global Navigation Satellite System (GNSS) as a frequency source.

12. The user equipment of claim 1, wherein a wireless communication specification specifies whether the target uplink frequency is controlled by the received downlink frequency or is independent of the received downlink frequency.

13. The user equipment of claim 1, wherein the satellite is the reference point.

14. The user equipment of claim 13, wherein the one or more processors are configured to:

estimate the Doppler drift based at least in part on additional position information or additional speed information.

15. The user equipment of claim 1, wherein the satellite is the reference point, and wherein the transmission frequency is equal to an assigned uplink frequency minus the estimated Doppler drift.

16. A method of wireless communication performed by a user equipment, comprising:

estimating a Doppler drift, associated with a service link between the user equipment and a reference point for an uplink transmission, using a position of the user equipment and an ephemeris associated with the reference point, wherein the reference point is one of:

a satellite that provides a cell covering the user equipment, the satellite being associated with a non-terrestrial network, or a gateway associated with the satellite;

determining a transmission frequency for the uplink transmission using the reference point and a target uplink frequency for signal reception at the reference point, wherein the determining includes adjusting the transmission frequency to compensate for the estimated Doppler drift, and wherein the transmission frequency is independent of a received downlink frequency of the user equipment; and transmitting the uplink transmission using the transmission frequency.

17. The method of claim 16, comprising:

receiving information indicating a location of the gateway or a Doppler drift value associated with a feeder link between the gateway and the satellite based at least in part on the gateway being the reference point.

18. The method of claim 16, wherein the target uplink frequency is an assigned uplink frequency for the uplink transmission measured at the reference point.

19. The method of claim 16, wherein the satellite is the reference point.

20. The method of claim 19, comprising:

estimating the Doppler drift based at least in part on additional position information or additional speed information.

21. The method of claim 16, wherein a wireless communication specification specifies whether the target uplink frequency is controlled by the received downlink frequency or is independent of the received downlink frequency.

22. The method of claim 16, wherein the satellite is the reference point, and wherein the transmission frequency is equal to an assigned uplink frequency minus the estimated Doppler drift.

23. A non-transitory computer-readable medium storing a set of instructions for wireless communication, the set of instructions comprising:

one or more instructions that, when executed by one or more processors of a user equipment, cause the user equipment to:

estimate a Doppler drift, associated with a service link between the user equipment and a reference point for an uplink transmission, using a position of the user equipment and an ephemeris associated with the reference point, wherein the reference point is one of:

a satellite that provides a cell covering the user equipment, the satellite being associated with a non-terrestrial network, or a gateway associated with the satellite;

determine a transmission frequency for the uplink transmission using the reference point and a target uplink frequency for signal reception at the reference point, wherein the determining includes adjusting the transmission frequency to compensate for the estimated Doppler drift, and wherein the transmission frequency is independent of a received downlink frequency of the user equipment; and transmit the uplink transmission using the transmission frequency.

24. The non-transitory computer-readable medium of claim 23, wherein the satellite is the reference point.

25. The non-transitory computer-readable medium of claim 23, wherein the reference point is defined in a wireless communication specification.

26. The non-transitory computer-readable medium of claim 23, wherein the target uplink frequency is an assigned uplink frequency for the uplink transmission measured at the reference point.

27. An apparatus for wireless communication, comprising:
 means for estimating a Doppler drift, associated with a service link between the apparatus and a reference point for an uplink transmission, using a position of the apparatus and an ephemeris associated with the reference point, wherein the reference point is one of:
  a satellite that provides a cell covering the apparatus, the satellite being associated with a non-terrestrial network, or
  a gateway associated with the satellite;
 means for determining a transmission frequency for the uplink transmission using the reference point and a target uplink frequency for signal reception at the reference point,
  wherein the determining includes adjusting the transmission frequency to compensate for the estimated Doppler drift, and
  wherein the transmission frequency is independent of a received downlink frequency of the apparatus; and
 means for transmitting the uplink transmission using the transmission frequency.

28. The apparatus of claim 27, wherein the satellite is the reference point.

29. The apparatus of claim 27, wherein the reference point is defined in a wireless communication specification.

30. The apparatus of claim 27, wherein the target uplink frequency is an assigned uplink frequency for the uplink transmission measured at the reference point.

* * * * *